Patented July 13, 1937

2,086,714

UNITED STATES PATENT OFFICE 2,086,714

COATING COMPOSITIONS

Robert T. Hucks, South River, N. J., assignor to E. I. du Pont de Nemours & Company, Wilmington, Del., a corporation of Delaware No Drawing. Application June 24, 1933, Serial No. 677,465

3 Claims. (Cl. 134—79)

This invention relates to coating compositions and, more particularly, to cellulose esters and polyhydric alcohol-polybasic acid resin coating compositions adapted to give white or light colored films of high initial luster and grease resistance.

For many finishing purposes it is not of particular importance that the coating composition employed should give a film of high initial luster because rubbing and polishing finishing operations can be afforded economically. This is usually true, for example, in the automotive industry. However, in other fields, because of the economics of this phase of the manufacture of the articles, rubbing and polishing operations are not permissible and, as a result, the property of high initial luster becomes of importance; in articles where a high luster finish is considered desirable, this becomes of major importance. Particularly is this true in the field of refrigerator finishes, with which the present invention is particularly concerned.

The field of refrigerator finishes has rapidly become one of great industrial interest with the advent and wide spread acceptance of the electrical and mechanical refrigerators. Practically all refrigerators are given a white or light colored finish and it is considered very desirable that such finishes should have a high luster. On the other hand, polishing and rubbing operations are not permissible due to the increased cost. Therefore, many attempts have been made to develop a composition which will deposit a film having a high initial luster, as well as other properties considered essential in refrigerator finishes, such as flexibility, color stability, and resistance to various types of refrigerants, grease, and water.

Heretofore the expedients offered to improve these finishes have usually involved modifications in the types and/or ratios of ingredients of the coating compositions. These different expedients have not met with commercial success because the changes made invariably cause a sacrifice in some essential property in order to increase the high initial luster. For example, it has been found that the use of antimony oxide in nitrocellulose compositions increases the initial luster of the coating material, but unfortunately, this is more than offset through sacrifice of color stability since exposure of such a film to hydrosulphide gas causes a marked degree of yellowing.

An object of the present invention is to provide new and improved coating compositions particularly for use in finishing refrigerators, although of general applicability where a white or light colored finish is desired of high initial luster, and where rubbing and polishing steps are not economically feasible. A further object of the invention is to provide such a coating composition having exceptional grease resistance. A further object of the invention is to provide such a composition having good durability, flexibility, color stability, and resistance to refrigerants and water. A still further object is to provide such a composition in which the rate of pigment settling on storage is appreciably reduced. Further objects of the invention will be apparent from the description given hereinafter.

The above objects are accomplished according to the present invention by employing in a coating composition having a cellulose ester vehicle or a polyhydric alcohol-polybasic acid resin vehicle, so-called colloidal zinc oxide.

For some years now there has been on the market a so-called colloidal zinc oxide whose individual particles have a diameter of approximately 0.15 micron. The diameters of all the particles come substantially within the range of 0.12–0.18 micron. This colloidal zinc oxide was developed for the rubber industry and, so far as is known, has not been used in the coating composition art to any appreciable extent.

It has been found that by employing this particular type of zinc oxide, cellulose ester coating compositions and polyhydric alcohol-polybasic acid resin compositions may be produced having exceptionally high initial luster, without sacrifice of other properties of such compositions considered essential for use as refrigerator finishes, and the like. It has also been found that by the use of this colloidal zinc oxide in cellulose ester compositions the amount of plasticizer required to give films of sufficient flexibility may be decreased 10%, or more, which decrease results in a material improvement in the grease resistance of films deposited from such compositions.

In order to illustrate the invention, the following example of a cellulose ester coating composition is given. Proportions are given by weight throughout the specification:

EXAMPLE 1

*Cellulose type enamel*

|  | Per cent |
|---|---|
| Cellulose nitrate | 17.6 |
| Denatured ethanol | 7.6 |
| Ethyl acetate | 12.5 |
| Butyl acetate | 22.5 |
| Toluol | 12.0 |
| Tricresyl phosphate | 9.5 |
| Titanium oxide | 7.8 |
| Colloidal zinc oxide | 10.5 |
|  | 100.0 |

A cellulose nitrate was selected in the above example having a nitrogen content of about 12% and a viscosity of 2.0–4.0 seconds as measured by the A. S. T. M., Tentative Specifications D–301–31 T, Formula B, although obviously various types of cellulose nitrate may be employed. The pigments may be dispersed according to any of the methods well known in the art, such as by the use of a roller mill, pebble mill, kneading machine, or the like. This composition may be applied by spraying, dipping, and other processes customarily employed in the art and a film deposited of excellent high initial luster, and superior grease resistance, without impairing other properties, such as color stability, water resistance, flexibility, and the like.

It is to be understood that the above example is merely illustrative and the ingredients and proportions may be varied considerably without departing from the invention. The solvents and non-solvents may be widely varied, as is well known to those skilled in the art, and likewise other plasticizers may be substituted, in part or wholly, for the tricresyl phosphate. However, it is preferred that tricresyl phosphate be employed in an amount not exceeding 55% of the cellulose nitrate and the proportion of colloidal zinc oxide to total solids be in excess of 15%. The reason for this is that a proportion of colloidal zinc oxide in the amount indicated is necessary to get a good high initial luster, while it also has the added advantage that the exceptionally low percentage of tricresyl phosphate can be employed while still obtaining a film of sufficient flexibility. By so reducing the plasticizer, the composition gives films of outstanding grease resistance not obtainable in compositions employing a higher and more usual percentage of plasticizer. Other plasticizers particularly suited for use in the present invention include dibutyl phthalate, dicyclohexyl phthalate, and dibutyl tartrate.

In the above example cellulose nitrate was used. However, the invention is also applicable to other cellulose derivative compositions, such as cellulose acetate, ethyl cellulose, and benzyl cellulose compositions.

To obtain the benefits of the present invention an appreciable proportion of colloidal zinc oxide must be employed, preferably more than 15% by weight of the total solids. Colloidal zinc oxide can be used as the sole white pigment or as the only pigment where a white coating composition is desired. However, it is more convenient to incorporate in the composition along with the colloidal zinc oxide other white pigments which are characterized by high hiding power, inasmuch as colloidal zinc oxide does not have as great hiding power as other pigments, such as titanium oxide.

To illustrate the advantages of employing a smaller percent of plasticizer in these compositions, an enamel was made up employing antimony oxide in place of colloidal zinc oxide, said composition being otherwise identical with that set forth in Example 1, except that an increase of 10% in the plasticizer was necessary to get an acceptable film. Grease resistance tests were then run on films deposited from the composition of Example 1 and the antimony oxide composition, and it was found that the grease resistance of the composition of Example 1 was materially superior. The grease resistance test was made by smearing butter on each of the two finishes and exposing the surfaces thus smeared in a humidity cabinet maintained at 100° F. and 100% relative humidity. The enamels were removed periodically and tested for softness by scratching with the thumb nail. After exposure for 21 days the colloidal zinc oxide composition showed only a very slight softening, whereas the antimony oxide composition showed complete softening after 15 days exposure. A further advantage of the composition of Example 1 was in its appreciably superior color stability when exposed to hydrogen sulfide. Such color stability is greatly to be desired in refrigerator finishes. The comparison has been made with an antimony oxide composition because heretofore the use of antimony oxide appeared to be the most practical method of obtaining an improvement in initial luster. Although the use of antimony oxide does improve the initial luster somewhat, it is only at a sacrifice of other essential properties of the finish, such as grease resistance and color stability when exposed to hydrogen sulfide.

The present invention is not necessarily limited to cellulose derivative compositions, as the use of colloidal zinc oxide in compositions containing a polyhydric alcohol-polybasic acid resin vehicle shows a radical improvement in high initial luster.

The following example illustrates a polyhydric alcohol-polybasic acid resin type enamel according to the present invention:—

Example 2

*Synthetic resin type enamel*

|  | Per cent |
|---|---|
| Colloidal zinc oxide | 45.7 |
| *"Synthetic" resin | 22.8 |
| Mineral spirits | 16.0 |
| Hi-flash naphtha | 7.0 |
| Solvent naphtha | 6.5 |
| Toluol | 2.0 |
|  | 100.0 |

*The "synthetic" resin in this composition is a reaction product of:—

|  | Per cent |
|---|---|
| Phthalic anhydride | 36.8 |
| Glycerine | 15.6 |
| Soya bean oil | 47.6 |
|  | 100.0 |

The resin was prepared by charging the materials into a kettle and heating to 225–245° C., maintaining this temperature until an acid number of 4 to 5.5 was obtained. This required approximately five to six hours.

The above example is merely illustrative and, as will be understood by those skilled in the art, the solvents and diluents may be varied widely. In this type of composition, no increase in grease resistance occurs through the use of the colloidal zinc oxide, since the vehicle itself contributes largely to the property of grease resistance. However, the improvement in initial luster of compositions of this type is even more marked than in the cellulose derivative compositions.

The invention is by no means limited to the particular resin disclosed in the example, since various types of polyhydric alcohol-polybasic acid resins modified with such oils as cocoanut, rapeseed, linseed, cottonseed, hydrogenated cottonseed, and perilla oils are suitable for this purpose. Likewise, higher aliphatic acids, such as oleic and stearic acids, may also be used as modifiers. The synthetic resin may be made from a wide variety of polyhydric alcohols and polybasic acids, as those acquainted with the art will recognize. Dihydric and trihydric alcohols, as well as higher polyhydric alcohols, such as sorbitol and pentaerythritol, may be used. Polyhydric ether alcohols, such as diethylene glycol, triethylene glycol, monoethylin, and the like, may also be used. In place of phthalic acid, other acids, such as malic, adipic, succinic, sebacic, and the like, may be used to prepare resins suitable for use in the present invention.

In general, it may be said that any polyhydric alcohol-polybasic acid resin may be employed, although it is preferable to avoid resins modified with oils of the hydroxylated long chain fatty acid type, such as castor oil, and preferably resins having acid numbers below 10 are used. Although resins with higher acid numbers can be used they are not as desirable because of their reactivity with the small particles of zinc oxide.

The proportion of colloidal zinc oxide present in these compositions directly influences the degree of initial luster. Thus, in Example 1, a good initial luster is obtained by using the pigment ratio indicated. If the titanium oxide-colloidal zinc oxide ratio should be altered to increase the titanium oxide content, a corresponding decrease in the initial luster will be apparent. Colloidal zinc oxide may be substituted for the titanium oxide content in these compositions, but in such case, the total pigment content will have to be somewhat increased in order to secure satisfactory hiding power. Where colloidal zinc oxide is used alone it has been found that a pigment content of approximately 25% in a formula as listed in Example 1 will provide a composition of satisfactory hiding power. However, no limits are set on the exact proportion of colloidal zinc oxide to be employed, as a suitable proportion for any particular purpose could be readily worked out by any one skilled in the art.

For some purposes, light colored or pastel shades are desirable and these are secured according to the present invention by admixing colored enamels of like vehicle composition with white enamels made according to the present invention, the white enamel usually being in predominant proportion in such compositions. Since the properties of the tinted compositions are largely controlled by the properties of the white composition, the benefits of the present invention are equally apparent in such tinted compositions.

It appears that the relatively small particle size of the zinc oxide is responsible for the superior initial luster and grease resistance of coating compositions of the present invention. Basically this pigment is identical with the more commonly used zinc oxide, except that the individual particles of normal zinc oxide are appreciably larger. The small sized particles seem to give films deposited from these compositions a high initial luster and also enable the plasticizer content in the cellulose derivative compositions to be decreased, thereby increasing the grease resistance of these compositions.

The present invention has been described particularly with respect to refrigerator enamels, but it is to be understood that the invention is broadly applicable to all white or light colored coating compositions where a high initial luster is desirable.

It will be seen from the description given above that by following the present invention, white or light colored coating compositions of exceptional initial luster, high grease resistance, and great color stability may be practically prepared without any appreciable increase in manufacturing costs. A further advantage of the present invention is the fact that pigment settling is greatly inhibited, presumably because of the small particle size of the colloidal zinc oxide. This is a distinct advantage, inasmuch as heretofore considerable difficulties have been encountered due to rapid pigment settling and hard caking.

By the term "colloidal zinc oxide" as used in the claims is meant zinc oxide identical in composition with the ordinary zinc oxide, except that the diameter of each individual particle is approximately 0.15 micron and the diameters of substantially all of the individual particles come within the range of 0.12 to 0.18 micron.

As many apparently widely different embodiments of this invention may be made without departing from the spirit and scope thereof, it is to be understood that the invention is not limited to the specific embodiments thereof except as defined in the appended claims.

I claim:

1. A high lustre grease-resisting coating composition comprising a vehicle selected from the group consisting of cellulose derivatives and polyhydric alcohol-polybasic acid resin vehicles, and zinc oxide, said zinc oxide being of a particle size such that the diameters of substantially all of the individual particles come within the range of 0.12 to 0.18 micron, and being in excess of 15% of the total solids present.

2. Product of claim 1 in which the composition contains cellulose nitrate, a solvent plasticizer selected from the group consisting of tricresyl phosphate, dibutyl phthalate, dicyclohexyl phthalate, and dibutyl tartrate, the proportion of plasticizer to cellulose nitrate being less than 55%.

3. Product of claim 1 in which the composition contains an oil-modified pohyhydric alcohol-polybasic acid resin having an acid number below 10.

ROBERT T. HUCKS.